United States Patent
Lee et al.

(10) Patent No.: US 8,570,408 B2
(45) Date of Patent: Oct. 29, 2013

(54) IMAGE PROCESSING APPARATUS AND METHOD

(75) Inventors: Hou-Hsien Lee, New Taipei (TW);
Chang-Jung Lee, New Taipei (TW);
Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 206 days.

(21) Appl. No.: 13/297,156

(22) Filed: Nov. 15, 2011

(65) Prior Publication Data

US 2012/0194695 A1 Aug. 2, 2012

(30) Foreign Application Priority Data

Jan. 27, 2011 (TW) .................................. 100103196

(51) Int. Cl.
*H04N 9/083* (2006.01)
*G06K 9/00* (2006.01)

(52) U.S. Cl.
USPC ............ 348/273; 348/280; 382/162; 382/167

(58) Field of Classification Search
USPC .......... 348/237, 273, 274, 277, 280; 382/162, 382/167
See application file for complete search history.

(56) References Cited

U.S. PATENT DOCUMENTS

| | | | |
|---|---|---|---|
| 6,947,607 B2 * | 9/2005 | Perlmutter et al. ............ | 382/266 |
| 7,035,478 B2 * | 4/2006 | Crandall et al. ............... | 382/284 |
| 7,327,492 B2 * | 2/2008 | Yokochi .......................... | 358/1.9 |
| 7,502,512 B2 * | 3/2009 | Toura ............................. | 382/209 |
| 8,199,229 B2 * | 6/2012 | Masuno et al. ................ | 348/276 |
| 8,463,035 B2 * | 6/2013 | Bechtel et al. ................. | 382/167 |
| 2008/0106620 A1 * | 5/2008 | Sawachi ......................... | 348/262 |
| 2010/0177962 A1 * | 7/2010 | Kalman ......................... | 382/167 |
| 2011/0080499 A1 * | 4/2011 | Steinberg et al. ............ | 348/224.1 |
| 2012/0201450 A1 * | 8/2012 | Bryant et al. .................. | 382/162 |
| 2013/0094758 A1 * | 4/2013 | Yadav ............................. | 382/167 |

* cited by examiner

*Primary Examiner* — Aung S Moe
*Assistant Examiner* — Amy Hsu
(74) *Attorney, Agent, or Firm* — Altis & Wispro Law Group, Inc.

(57) ABSTRACT

An image processing apparatus receives a plurality of consecutive images, and regards pixels having the same coordinates in each of the consecutive images as a pixel match. The apparatus determines a range for red values, a range for green values, and a range for blue values in each pixel match, and filters out R, G, and B values which fall outside a corresponding range for the pixel match. In addition, the apparatus calculates an average R value, an average G value, and an average B value for each pixel match according to remaining R values, remaining G values, and remaining B values of the pixel match, and creates a new image by taking the average R value, the average G value, and the average B value of each pixel match as color values of a corresponding pixel in the new image.

12 Claims, 7 Drawing Sheets

|   | t=1 (0,0) ↓ | t=2 (0,0) ↓ | t=3 (0,0) ↓ | t=4 (0,0) ↓ | t=5 (0,0) ↓ | t=6 (0,0) ↓ | t=7 (0,0) ↓ | t=8 (0,0) ↓ | t=9 (0,0) ↓ | t=10 (0,0) ↓ |
|---|---|---|---|---|---|---|---|---|---|---|
| R | 165 | 162 | 168 | 155 | 121 | 152 | 204 | 159 | 159 | 169 |
| G | 158 | 156 | 160 | 154 | 115 | 155 | 213 | 154 | 158 | 153 |
| B | 197 | 194 | 195 | 190 | 156 | 194 | 234 | 192 | 196 | 193 |

FIG. 5

|   | t=1 | t=2 | t=3 | t=4 | t=5 | t=6 | t=7 | t=8 | t=9 | t=10 |
|---|---|---|---|---|---|---|---|---|---|---|
|   | (0,0) | (0,0) | (0,0) | (0,0) | (0,0) | (0,0) | (0,0) | (0,0) | (0,0) | (0,0) |
| R | 165 | 162 | 168 | 155 | 121 | 152 | 204 | 159 | 159 | 169 |
| G | 158 | 156 | 160 | 154 | 115 | 155 | 213 | 154 | 158 | 153 |
| B | 197 | 194 | 195 | 190 | 156 | 194 | 234 | 192 | 196 | 193 |

FIG. 6

|   | t=1<br>(0,0)↓ | t=2<br>(0,0)↓ | t=3<br>(0,0)↓ | t=4<br>(0,0)↓ | t=5<br>(0,0)↓ | t=6<br>(0,0)↓ | t=7<br>(0,0)↓ | t=8<br>(0,0)↓ | t=9<br>(0,0)↓ | t=10<br>(0,0)↓ |
|---|---|---|---|---|---|---|---|---|---|---|
| R | 165 | 162 | 168 | 155 | 121 | 152 | 204 | 159 | 159 | 169 |
| G | 158 | 156 | 160 | 154 | 115 | 155 | 213 | 154 | 158 | 153 |
| B | 197 | 194 | 195 | 190 | 156 | 194 | 234 | 192 | 196 | 193 |

FIG. 7

IMAGE PROCESSING APPARATUS AND METHOD

BACKGROUND

1. Technical Field

The embodiments of the present disclosure relate to data processing technology, and particularly to an image processing apparatus and method.

2. Description of Related Art

Digital cameras are very popular and widely used in daily life. However, images captured by a digital camera may have an off-color effect due to inaccurate focusing, bad illumination, or movement of objects (such as children or pets) to be captured.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
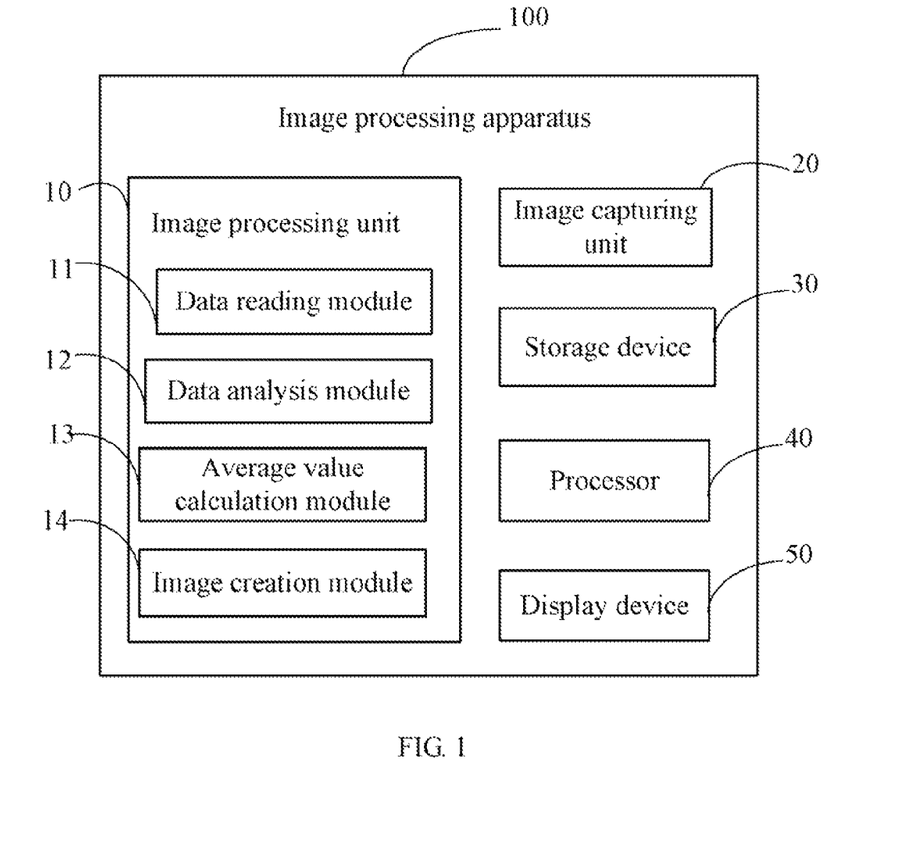
FIG. 1 is a block diagram of one embodiment of function modules of an image processing apparatus.

FIG. 1 is a block diagram of one embodiment of function modules of an image processing apparatus 100. In one embodiment, the image processing apparatus 100 includes an image processing unit 10, an image capturing unit 20, a storage device 30, a processor 40, and a display device 50. The image capturing unit 20 captures multiple consecutive images of an object under a consecutive shooting mode of the image processing apparatus 100. Depending on the embodiment, the image processing apparatus may be a digital camera, a digital video, a computer or a mobile phone having an image capturing function. The image capturing unit 20 may be a charge-coupled device (CCD) or a complementary metal oxide semiconductor (CMOS).

Figure 2:
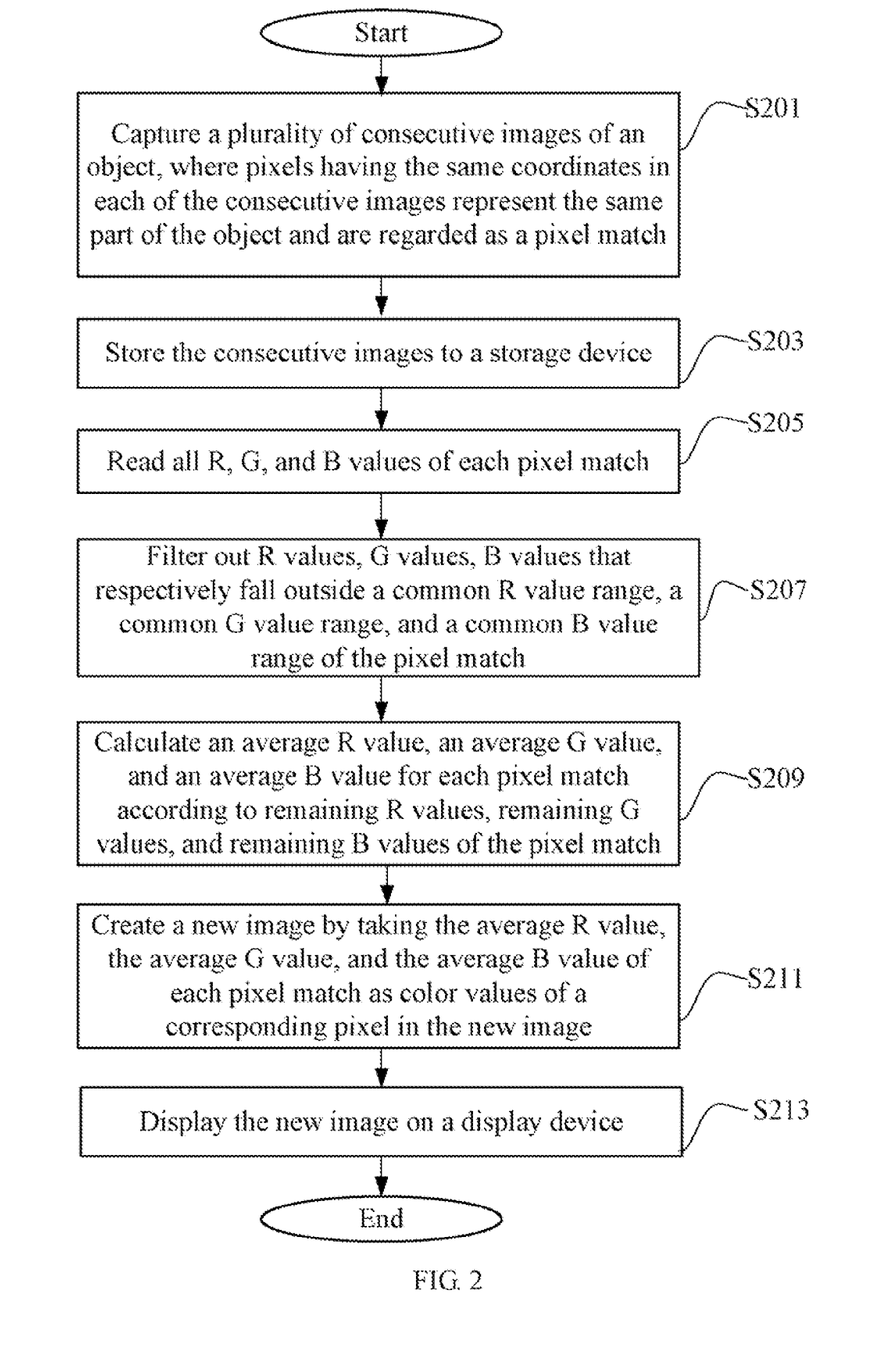
FIG. 2 is a flowchart of one embodiment of an image processing method.

The image processing unit 10 includes a data reading module 11, a data analysis module 12, an average value calculation module 13, and an image creation module 14. The modules 11-14 may include computerized code in the form of one or more programs that are stored in the storage device 30. The computerized code includes instructions to be processed by the processor 40 for processing the multiple consecutive images to create a new image. A detailed description of the functions of the modules 11-14 are illustrated in FIG. 2. The storage device 30 may be a cache or a dedicated memory, such as an EPROM, HDD, or flash memory. The display device 50 displays the multiple consecutive images and the new image.

FIG. 2 is a flowchart of one embodiment of an image processing method. Depending on the embodiment, additional blocks may be added, others removed, and the ordering of the blocks may be changed.

Figure 3:
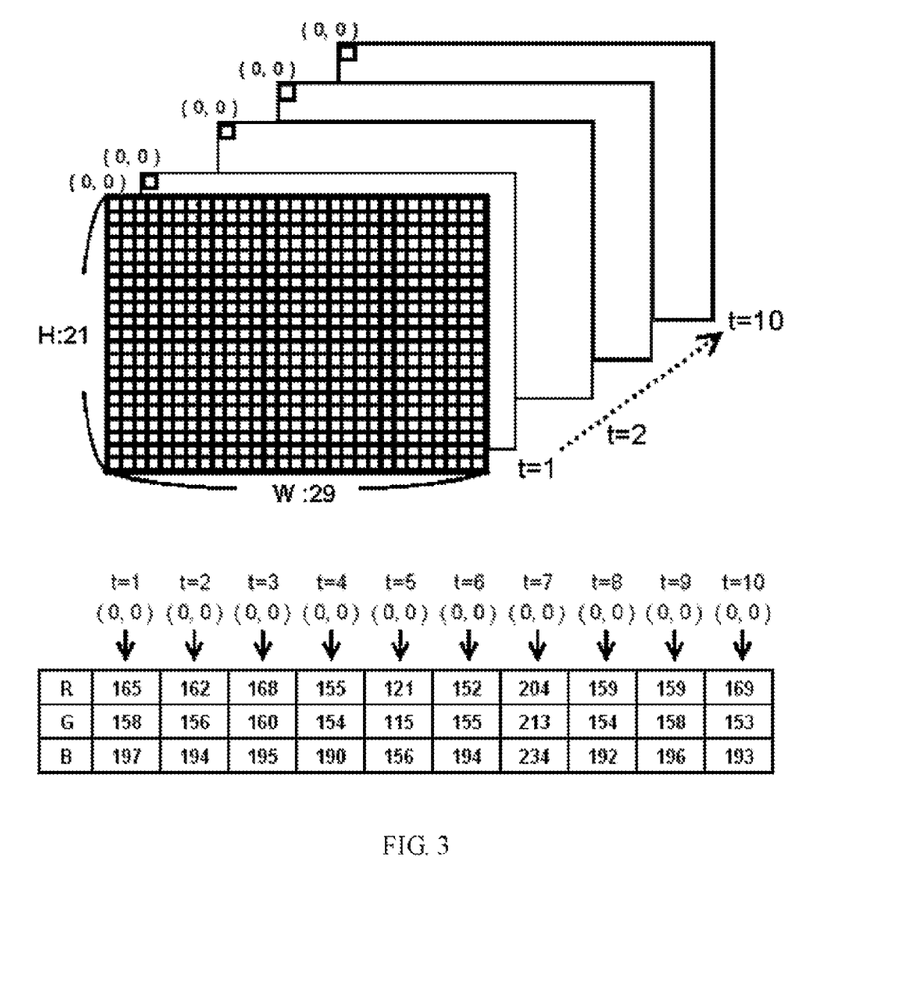
FIG. 3 is an embodiment of exemplary for illustrating a point match in multiple consecutive images and a table recording R, G, B values of the point match in each image of the multiple consecutive images.

In block S201, the image capturing device 20 captures a plurality of consecutive images of an object in a consecutive shooting mode of the image processing apparatus 100. For example, as shown in FIG. 3, ten consecutive images labeled t=1, t=2, . . . , t=10 are captured within one second. The consecutive images have the same resolution, such as 1024 pixels×768 pixels, namely each of the consecutive images consists of the same number of pixels in a horizontal direction and a vertical direction. In one embodiment, the pixels having the same coordinates in each of the consecutive images represent the same part of the object and are regarded as a pixel match, and each pixel in the pixel match represents the same part of the object in the consecutive images. For example, as shown in FIG. 3, the ten pixels located on a position (0, 0) in each of the ten consecutive images are regarded as a pixel match.

In block S203, the data reading module 11 stores the consecutive images into the storage device 30.

In block S205, the data reading module 11 reads all red (R), green (G), and blue (B) values of each pixel match from the consecutive images. For example, as shown in FIG. 3, the R, G, and B values of the point match located on the position (0, 0) in each image of the ten consecutive images are recorded in a table.

Figure 4:
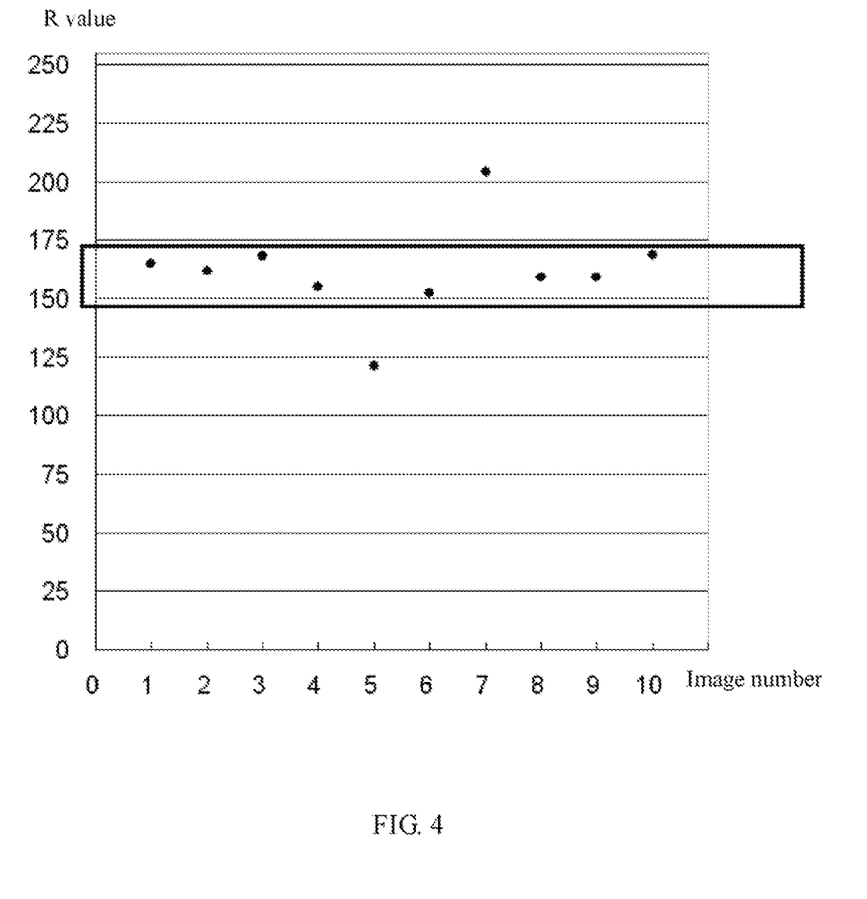
FIG. 4 illustrates filtering of the R, G, and B values of the point match shown in FIG. 3.
Figure 5:
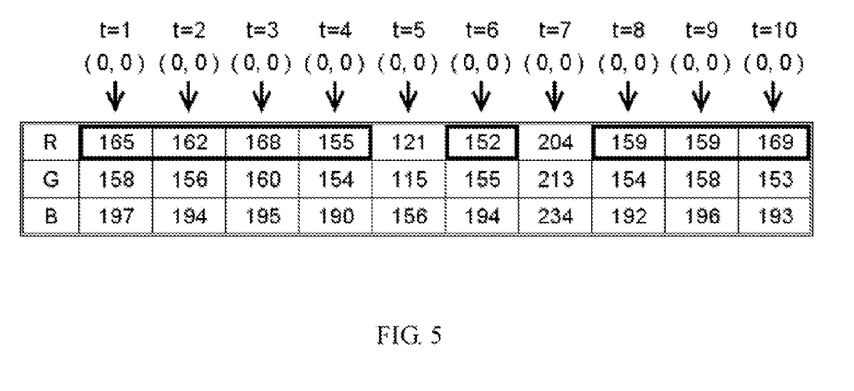
FIG. 5-FIG. 7 illustrates remaining R, G, and B values of the point match in FIG. 3.
Figure 6:
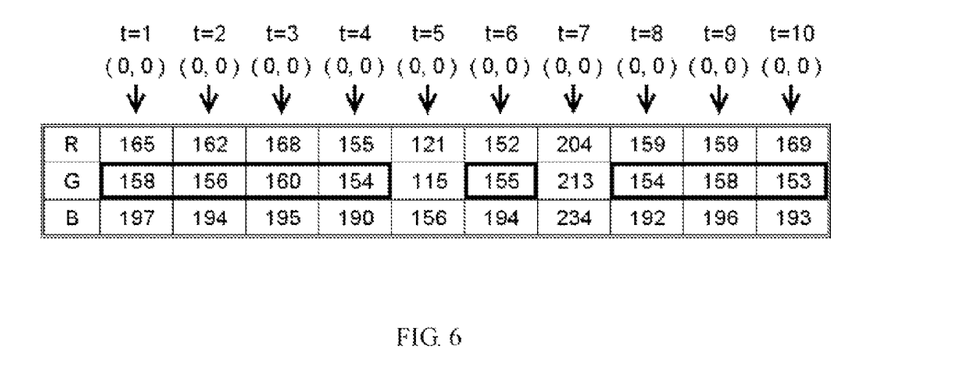
Figure 7:
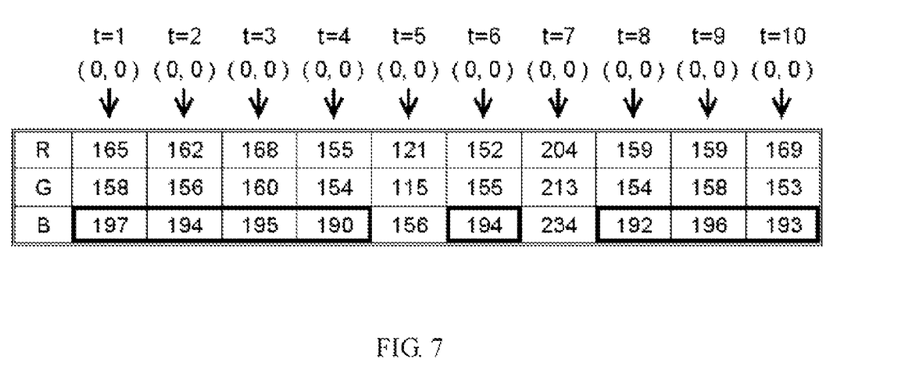

In block S207, the data analysis module 12 analyzes all the R, G, and B values of each pixel match to determine a common R value range, a common G value range, and a common B value range of the pixel match, and filters out the R values, the G values, and the B values of each pixel match that respectively fall outside the common R value range, the common G value range, and the common B value range of the pixel match. In one embodiment, the common R, G, and B value ranges of a pixel match are determined according to distribution of the R values, G values, and B values of the pixel match. For example, FIG. 4 shows a distribution diagram of the R values of the point match in relation to position (0, 0) in each image of the ten consecutive images. As seen in FIG. 4, a majority of the R values in relation to the position (0, 0) fall inside a particular value range [150, 175], and only a few R values fall outside the value range [150, 175]. For example, the R values in relation to the position (0, 0) in the images labeled t=1, t=2, t=3, t=4, t=6, t=8, t=9, and t=10 fall inside the value range [150, 175], and only the R values in the images labeled t=5 and t=7 falls outside the value range [150, 175]. Then, the common R value range in relation to the position (0, 0) may be determined as [150, 175], and the R values in relation to the position (0, 0) in the images labeled t=5 and t=7 are filtered out. Remaining R values of the pixel match in relation to the position (0, 0) are highlighted in the table shown in FIG. 5. Remaining G values of the pixel match in relation to the position (0, 0) are highlighted in the table shown in FIG. 6. Remaining B values of the pixel match in relation to the position (0, 0) in are highlighted in the table shown in FIG. 7

In block S209, the average value calculation module 13 calculates an average value for R values, an average value for G values, and an average value for B values for each pixel match according to remaining R values, remaining G values, and remaining B values of the pixel match. For example, the average value for R values in relation to the position (0, 0) is (165+162+168+155+152+159+159+169)/8=161, the average value for G values in relation to the position (0, 0) is (158+156+160+154+155+154+158+153)/8=156, and the average value for B values in relation to the position (0, 0) is (197+194+195+190+194+192+196+193)/8=194.

In block S211, the image creation module 14 creates a new image by taking the average R value, the average G value, and the average B value of each pixel match as color values of a corresponding pixel in the new image. For example, the pixel match, which is given the average values for R, G, and B of (161, 156, 194), located in the position (0, 0) in each image of the ten consecutive images is treated as the color values of the pixel located in the position (0, 0) in the new image.

In block S213, the image creation module 14 displays the new image on the display device 50.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An image processing method being performed by execution of instructions by a processor of an image processing apparatus, the method comprising:

receiving a plurality of consecutive images of an object captured by an image capturing unit of the image processing apparatus, wherein pixels having the same coordinates in each of the consecutive images represent the same part of the object and are regarded as a pixel match;

reading all red (R), green (G), and blue (B) values of each pixel match from the consecutive images;

analyzing all R, G, and B values of each pixel match to determine a common R value range, a common G value range, and a common B value range of the pixel match, and filtering R values, G values, and B values of the pixel match that respectively fall outside the common R value range, the common G value range, and the common B value range of the pixel match;

calculating an average R value, an average G value, and an average B value for each pixel match according to remaining R values, remaining G values, and remaining B values of the pixel match; and creating a new image by taking the average R value, the average G value, and the average B value of each pixel match as color values of a corresponding pixel in the new image.

2. The method of claim 1, further comprising: displaying the new image on a display device of the image processing apparatus.

3. The method of claim 1, wherein the consecutive images and the new image are stored in a storage device of the image processing apparatus.

4. The method of claim 1, wherein the image processing apparatus is a digital camera, a digital video, a computer or a mobile phone having image capturing function.

5. A non-transitory medium storing a set of instructions, the set of instructions capable of being executed by a processor of an image processing apparatus to perform an image processing method, the method comprising:

receiving a plurality of consecutive images of an object captured by an image capturing unit of the image processing apparatus, wherein pixels having the same coordinates in each of the consecutive images represent the same part of the object and are regarded as a pixel match;

reading all red (R), green (G), and blue (B) values of each pixel match from the consecutive images;

analyzing all R, G, and B values of each pixel match to determine a common R value range, a common G value range, and a common B value range of the pixel match, and filtering R values, G values, and B values of the pixel match that respectively fall outside the common R value range, the common G value range, and the common B value range of the pixel match;

calculating an average R value, an average G value, and an average B value for each pixel match according to remaining R values, remaining G values, and remaining B values of the pixel match; and creating a new image by taking the average R value, the average G value, and the average B value of each pixel match as color values of a corresponding pixel in the new image.

6. The medium of claim 5, wherein the method further comprises: displaying the new image on a display device of the image processing apparatus.

7. The medium of claim 5, wherein the consecutive images and the new image are stored in a storage device of the image processing apparatus.

8. The medium of claim 5, wherein the image processing apparatus is a digital camera, a digital video, a computer or a mobile phone having image capturing function.

9. An image processing apparatus, comprising:

a storage device;

a processor; and one or more programs stored in the storage device and being executable by the processor, the one or more programs comprising instructions:

to receive a plurality of consecutive images of an object captured by an image capturing unit of the image processing apparatus, wherein pixels having the same coordinates in each of the consecutive images represent the same part of the object and are regarded as a pixel match;

to read all red (R), green (G), blue (B) values of each pixel match from the consecutive images;

to determine a common R value range, a common G value range, and a common B value range of each pixel match by analyzing all R, G, B values of the pixel match, and to filter R values, G values, and B values of the pixel match that respectively fall outside the common R value range, the common G value range, and the common B value range of the pixel match;

to calculate an average R value, an average G value, and an average B value for each pixel match according to remaining R values, remaining G values, and remaining B values of the pixel match; and to create a new image by taking the average R value, the average G value, and the average B value of each pixel match as color values of a corresponding pixel in the new image.

10. The apparatus of claim 9, wherein the one or more programs further comprising instructions:

to display the new image on a display device of the image processing apparatus.

11. The apparatus of claim 9, wherein the consecutive images and the new image are stored in the storage device.

12. The apparatus of claim 9, wherein the apparatus is a digital camera, a digital video, a computer or a mobile phone having image capturing function.

* * * * *